(12) United States Patent
Zhang (10) Patent No.: US 11,740,982 B2
(45) Date of Patent: *Aug. 29, 2023

(54) SERVICE TAKEOVER METHOD, STORAGE DEVICE, AND SERVICE TAKEOVER APPARATUS

(71) Applicant: HUAWEI TECHNOLOGIES CO., LTD., Guangdong (CN)

(72) Inventor: Cheng Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/826,428

(22) Filed: May 27, 2022

(65) Prior Publication Data

US 2022/0283914 A1 Sep. 8, 2022

Related U.S. Application Data

(63) Continuation of application No. 16/855,087, filed on Apr. 22, 2020, now Pat. No. 11,347,603, which is a
(Continued)

(51) Int. Cl.
*G06F 11/00* (2006.01)
*G06F 11/20* (2006.01)
(Continued)

(52) U.S. Cl.
CPC ........ *G06F 11/2033* (2013.01); *G06F 11/165* (2013.01); *G06F 11/1645* (2013.01);
(Continued)

(58) Field of Classification Search
CPC ............ G06F 11/1645; G06F 11/165; G06F 11/2025; G06F 11/2035; G06F 11/2048;
(Continued)

(56) References Cited

U.S. PATENT DOCUMENTS 8,166,339 B2 * 4/2012 Kyusojin ................ G06F 12/06
710/316
8,682,852 B1 * 3/2014 Salamon ............. G06F 11/1471
707/661
(Continued)

FOREIGN PATENT DOCUMENTS

CN 101060391 A 10/2007
CN 101124543 A 2/2008
(Continued)

OTHER PUBLICATIONS

Office Action issued in Chinese Application No. 201580003092.1 dated Dec. 4, 2019, 8 pages (with English translation).
(Continued)

*Primary Examiner* — Sarai E Butler
(74) *Attorney, Agent, or Firm* — Fish & Richardson P.C.

(57) ABSTRACT

The present disclosure describes example service takeover methods, storage devices, and service takeover apparatuses. In one example method, when a communication fault occurs between two storage devices in a storage system, the two storage devices respectively obtain running statuses of the two storage devices. A running status can reflect current usage of one or more system resources of a particular storage device. Then, a delay duration is determined according to the running statuses, where the delay duration is a duration for which the storage device waits before sending an arbitration request to a quorum server. The two storage devices respectively send, after the delay duration, arbitration requests to the quorum server to request to take over a service. The quorum server then can select a storage device in a relatively better running status to take over a host service.

10 Claims, 6 Drawing Sheets

Related U.S. Application Data continuation of application No. 15/874,722, filed on Jan. 18, 2018, now Pat. No. 10,705,930, which is a continuation of application No. PCT/CN2015/098487, filed on Dec. 23, 2015.

(51) Int. Cl.
*H04L 1/22* (2006.01)
*H04L 67/1097* (2022.01)
*G06F 11/16* (2006.01)

(52) U.S. Cl.
CPC ...... *G06F 11/2025* (2013.01); *G06F 11/2035* (2013.01); *G06F 11/2048* (2013.01); *G06F 11/2097* (2013.01); *H04L 1/22* (2013.01); *H04L 67/1097* (2013.01); *G06F 11/2028* (2013.01); *G06F 11/2056* (2013.01); *G06F 2201/805* (2013.01)

(58) Field of Classification Search
CPC ............. G06F 11/2097; G06F 11/2028; G06F 11/2056
USPC ........................................ 714/1–57
See application file for complete search history.

(56) References Cited

U.S. PATENT DOCUMENTS

| | | | |
|---|---|---|---|
| 8,868,731 B1 | 10/2014 | Tsai et al. | |
| 2004/0025166 A1 | 2/2004 | Adlung et al. | |
| 2006/0020853 A1 | 1/2006 | Alex et al. | |
| 2009/0024869 A1 | 1/2009 | Kitamura et al. | |
| 2010/0125682 A1* | 5/2010 | Andres | G06F 11/2092 710/15 |
| 2011/0173233 A1* | 7/2011 | Matsumura | G06F 11/2028 707/E17.014 |
| 2012/0005165 A1 | 1/2012 | Tsai et al. | |
| 2012/0124414 A1* | 5/2012 | Dallas | H04L 41/069 714/E11.095 |
| 2013/0124915 A1* | 5/2013 | Sano | G06F 11/2074 714/6.2 |
| 2013/0166993 A1 | 6/2013 | Lee et al. | |
| 2013/0201891 A1 | 8/2013 | Rodriguez et al. | |
| 2014/0149622 A1 | 5/2014 | Cummings et al. | |
| 2014/0258608 A1* | 9/2014 | Viswanatha | G06F 11/00 711/113 |
| 2014/0281669 A1* | 9/2014 | DeCusatis | H04L 41/0695 714/4.11 |
| 2015/0058475 A1 | 2/2015 | Earl et al. | |
| 2015/0257141 A1 | 9/2015 | Kulal et al. | |
| 2015/0280969 A1 | 10/2015 | Gates et al. | |
| 2017/0013058 A1 | 1/2017 | Annamalai et al. | |
| 2017/0353367 A1 | 12/2017 | Slaight et al. | |
| 2019/0173943 A1 | 6/2019 | Rozenbaum et al. | |

FOREIGN PATENT DOCUMENTS

| | | |
|---|---|---|
| CN | 101835062 A | 9/2010 |
| CN | 102833096 A | 12/2012 |
| CN | 104980693 A | 10/2015 |
| CN | 105049258 A | 11/2015 |
| CN | 105095125 A | 11/2015 |

OTHER PUBLICATIONS

Extended European Search Report issued in European Application No. 15911109.5 dated Oct. 15, 2018, 7 pages.

International Search Report and Written Opinion in International Application No. PCT/CN2015/098487, dated Sep. 14, 2016, 13 pages (with English translation).

Search Report issued in Chinese Application 20158003092.1 dated Nov. 26, 2019, 5 pages (partial English translation).

* cited by examiner

SERVICE TAKEOVER METHOD, STORAGE DEVICE, AND SERVICE TAKEOVER APPARATUS

CROSS-REFERENCE TO RELATED APPLICATIONS

This application is a continuation of U.S. patent application Ser. No. 16/855,087, filed on Apr. 22, 2020, which is a continuation of U.S. patent application Ser. No. 15/874,722, filed on Jan. 18, 2018, now U.S. Pat. No. 10,705,930, which is a continuation of International Application No. PCT/CN2015/098487, filed on Dec. 23, 2015. All of the aforementioned patent applications are hereby incorporated by reference in their entireties.

TECHNICAL FIELD

Embodiments of the present invention relate to the field of storage technologies, and in particular, to a service takeover method, a storage device, and a service takeover apparatus.

BACKGROUND

For protecting data security and for a purpose of redundancy (Disaster Recovery), storage vendors establish a geographic redundancy center to implement remote backup of data, so that original data is not lost or damaged after a disaster (such as a tire or an earthquake) occurs, and a key service can resume running in an allowable time range, to minimize a loss brought by the disaster.

Currently, a main storage system is a two-center storage system. The two-center storage system implements redundancy by establishing two data centers. Both the two data centers can receive a service request from a host, and store service data in respective storage devices. Then, data synchronization is implemented by using a link between the data centers. However, once a fault occurs on the link, the data synchronization is interrupted. Therefore, a data center needs to be designated to bear a data service of the host, and after fault recovery of the link, data received before the fault recovery is backed up to another data center.

Generally, when a fault occurs on the link, the two data centers immediately and respectively send arbitration requests to a quorum server, and the quorum server determines, according to an arbitration request receiving sequence, the data center that is to bear the data service.

SUMMARY

Embodiments of the present invention provide a service takeover method, a storage device, and a service takeover apparatus. When a communication fault occurs between a storage device and another storage device, an arbitration request can be submitted to a quorum server after delay duration according to current usage of a respective system resource, so that the quorum server can select a storage device in a better running status to take over a host service.

A first aspect of the embodiments provides a service takeover method. A storage system to which the method is applied includes a first storage device, a second storage device, and a quorum server. Data communication is performed between the first storage device and the second storage device by using a link. The first storage device obtains a running status of the first storage device when a communication fault occurs between the first storage device and the second storage device. The running status reflects current usage of a system resource of the first storage device. The system resource includes at least one or any combination of the following resources: a processor resource, a hard disk resource, a cache resource, or a host bandwidth resource. The first storage device determines delay duration according to the running status, where the delay duration is duration for which the first storage device waits before sending an arbitration request to the quorum server. The first storage device sends, after the delay duration, the arbitration request to the quorum server to request to take over a service. Similarly, when determining that a communication fault occurs between the second storage device and the first storage device, the second storage device obtains a running status of the second storage device, and determines delay duration according to the running status. The second storage device sends, after the delay duration, an arbitration request to the quorum server to request to take over a service. After receiving the arbitration requests sent by the two storage devices, the quorum server determines, based on a first received arbitration request, a storage device that is to take over a host service.

A storage device needs to wait for a period of time before sending an arbitration request to the quorum server. Waiting duration is also referred to as delay duration, and is determined according to a running status of the storage device. The running status reflects current usage of a system resource of the storage device. Therefore, the quorum server can select a storage device in a better running status from storage devices that send arbitration requests to take over a host service.

With reference to the first aspect, in a first implementation, the first storage device reads a running status value of the first storage device, where the running status value is a sum of status values of all system resources. A status value of each system resource is obtained according to a current usage ratio of each system resource and a preset correspondence, and the correspondence includes a correspondence between a current usage ratio of the processor resource and a status value of the processor resource, a correspondence between a current usage ratio of the hard disk resource and a status value of the hard disk resource, a correspondence between a current usage ratio of the cache resource and a status value of the cache resource, and a correspondence between a current usage ratio of the host bandwidth resource and a status value of the host bandwidth resource. In this implementation, usage of each system resource may be reflected by a running status value. Therefore, the current usage of the system resource of the first storage device is better reflected, so that more proper delay duration may be obtained according to the running status value.

With reference to the first implementation, in a second implementation, the delay duration may be obtained according to the running status value and a formula $T=k*S$, where T is the delay duration, S is the running status value, and k is any value. This implementation provides a specific algorithm to associate the delay duration with the running status value. In general, the delay duration may be directly proportional to the running status value, that is, a greater running status value leads to longer waiting duration.

With reference to the second implementation, in a third implementation, $k=1$. The quorum server generally determines, based on a first received arbitration request, a storage device that is to take over a host service. Therefore, the delay duration is set, so that the quorum server can select a storage device in a better running status from storage devices that send arbitration requests to take over a host service. Excessively short delay duration is improper, because excessively short waiting duration is unfavorable to distinguishing a sequence in which storage devices send arbitration requests. Excessively long delay duration is also improper, because excessively long waiting duration is unfavorable to processing a host service. Therefore, k is set to 1 in this implementation.

With reference to any one of the foregoing implementations of the first aspect, in a fourth implementation, the storage system further includes a host. The first storage device communicates with the host by using a front-end port. The first storage device may detect a status of the front-end port, and when determining that the status of the front-end port is valid, read the running status value of the first storage device. If the status of the front-end port is invalid, it indicates that communication between the first storage device and the host is interrupted, and the first storage device cannot take over a host service. Therefore, in this case, the first storage device does not need to send an arbitration request to the quorum server.

With reference to any one of the foregoing implementations, in a fifth implementation, the arbitration request sent by the first storage device to the quorum server includes an arbitration ID and a device identifier of first storage device. After receiving the arbitration request, the quorum server determines whether the arbitration ID carried in the arbitration request is consistent with a pre-stored arbitration ID, and if the arbitration ID carried in the arbitration request is consistent with a pre-stored arbitration ID, determines that the first storage device is in an arbitration scope of the quorum server. In addition, if the quorum server does not receive, before receiving the arbitration request sent by the first storage device, an arbitration request sent by another storage device, the quorum server may determine that the first storage device is to take over a host service In this case, the quorum server may find a corresponding identifier of the device identifier according to the device identifier of the first storage device, and add the corresponding identifier to a response message to send to the first storage device.

With reference to the fifth implementation, in a sixth implementation, the quorum server obtains a device identifier of the second storage device according to the device identifier of the first storage device, an arbitration ID, and a correspondence between the arbitration ID and the device identifier of the second storage device, further obtains a corresponding identifier of the device identifier of the second storage device according to a correspondence between the device identifier of the second storage device and the corresponding identifier, and deletes the corresponding identifier. Even if the second storage device subsequently sends an arbitration request to the quorum server, the quorum server does not respond to the arbitration request because the corresponding identifier of the device identifier of the second storage device is deleted. No request response is received, and consequently, the second storage device cannot take over a host service.

A second aspect of the embodiments provides another service takeover method. A storage system to which the method is applied includes a first storage device, a second storage device, and a quorum server. Data communication is performed between the first storage device and the second storage device by using a link. When a communication fault occurs between the first storage device and the second storage device, the first storage device sends a first arbitration request to the quorum server, and the second storage device sends a second arbitration request to the quorum server. After receiving the arbitration requests sent by the two storage devices, the quorum server separately queries statuses of front-end ports of the two storage devices. If the statuses of the front-end ports are valid, the quorum server continues to receive running statuses of the two storage devices, after comparing the running statuses of the two storage devices, selects a storage device in a better running status to take over a host service, and sends a request response to the storage device.

In the service takeover method provided in the second aspect, whether a storage device takes over a host service is determined according to a running status of the storage device. The running status reflects current usage of a system resource of the storage device. Therefore, the quorum server can select a storage device in a better running status from storage devices that send arbitration requests to take over a host service. Compared with the first aspect of the embodiments, the service takeover method provided in the second aspect is mainly performed by the quorum server. Therefore, load of the storage device may be reduced to some extent.

A third aspect of the embodiments provides a storage device, configured to perform at least one method described in the first aspect.

A fourth aspect of the embodiments provides a service takeover apparatus, and the service takeover apparatus is located in a storage device, and configured to perform at least one method described in the first aspect.

According to the storage device provided in the third aspect and the service takeover apparatus provided in the fourth aspect of the embodiments, a storage device may wait for a period of time before sending an arbitration request to the quorum server. Waiting duration is also referred to as delay duration, and is determined according to a running status of the storage device. The running status reflects current usage of a system resource of the storage device. Therefore, the quorum server can select a storage device in a better running status from storage devices that send arbitration requests to take over a host service.

A fifth aspect of the embodiments provides a quorum server, configured to perform the method described in the second aspect.

According to the quorum server provided in the fifth aspect, whether a storage device takes over a host service is determined according to a running status of the storage device. The running status reflects current usage of a system resource of the storage device. Therefore, the quorum server can select a storage device in a better running status from storage devices that send arbitration requests to take over a host service. Compared with the first aspect of the embodiments, the quorum server provided in the fifth aspect can reduce load of the storage device to some extent.

A sixth aspect of the embodiments of the present invention provides a computer program product, including a computer-readable storage medium that stores program code, where an instruction included in the program code may be executed by the storage device of the foregoing third aspect, and used to perform at least one method of the foregoing first aspect.

According to the computer program product provided in the sixth aspect of the embodiments of the present invention, a storage device may wait for a period of time before sending an arbitration request to a quorum server. Waiting duration is also referred to as delay duration, and is determined according to a running status of the storage device. The running status reflects current usage of a system resource of the storage device. Therefore, the quorum server can select a storage device in a better running status from storage devices that send arbitration requests to take over a host service.

A seventh aspect of the embodiments of the present invention provides a computer program product, including a computer-readable storage medium that stores program code, where an instruction included in the program code may be executed by the quorum server of the foregoing fifth aspect, and used to perform the method of the foregoing second aspect.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

Figure 1:
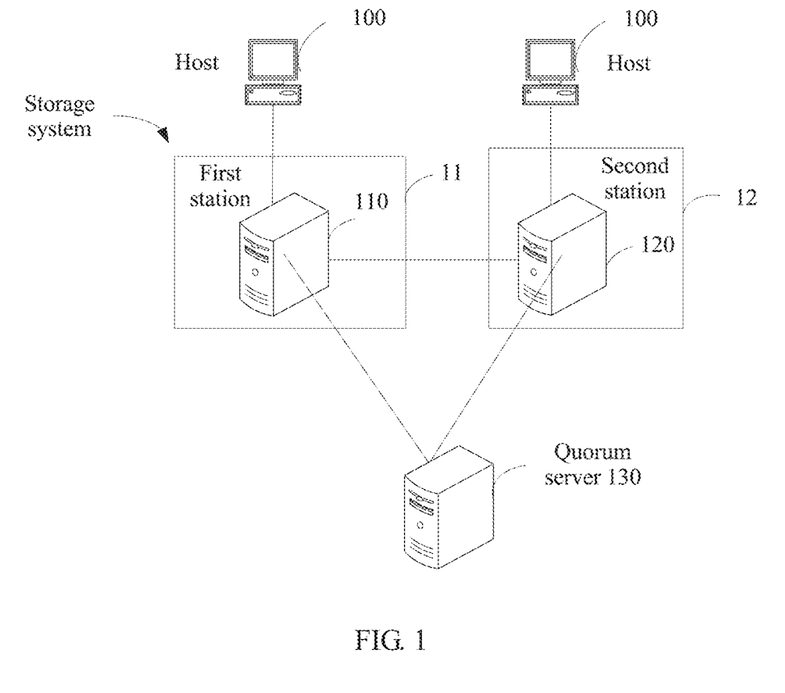
FIG. 1 is an application scenario diagram according to an embodiment of the present invention.

A service takeover method provided in an embodiment of the present invention is mainly applied to a storage system with two data centers. The storage system with two data centers in this embodiment of the present invention is a storage system including two or more data centers. For ease of description, in this embodiment of the present invention, the storage system with two data centers is used as an example for description. As shown in FIG. 1, FIG. 1 is a schematic diagram of an application scenario according to an embodiment of the present invention. A storage system shown in FIG. 1 includes at least two hosts 100 and two data centers. For ease of description, in this embodiment of the present invention, the two data centers shown in FIG. 1 are respectively referred to as a first station 11 and a second station 12. Data transmission may be performed between the two data centers by using the Internet Protocol (IP) or a Fiber Channel (FC). In this embodiment of the present invention, communication may be performed between the host 100 and the first station 11 or between the host 100 and the second station 12 by using the FC or the Small Computer Systems Interface (SCSI) protocol and based on the Internet Small Computer Systems Interface (iSCSI) protocol. This is not limited herein.

The first station 11 includes a first storage device 110, and the second station 12 includes a second storage device 120. The first storage device 110 and the second storage device 120 may be any known storage device in the prior art, such as a storage array or a server. For example, the first storage device 110 and the second storage device 120 may include a storage area network (SAN) array, or may include a network attached storage (NAS) array. In this embodiment of the present invention, a specific form of the storage device in the data center is not limited. It should be noted that all methods in embodiments of the present invention are performed by the storage devices in these stations. For ease of description, in this embodiment of the present invention, unless otherwise stated, the first station 11 is the first storage device 110 in the first station 11, and the second station 12 is the second storage device 120 in the second station 12.

In the application scenario shown in FIG. 1, there is a relatively short distance between the first station 11 and the second station 12. Generally, a distance between the first station 11 and the second station 12 may be less than 100 km. For example, the first station 11 and the second station 12 may be located in two different positions of a same city. Certainly, in this embodiment of the present invention, the first station 11 and the second station 12 may be not in a same city as long as synchronous replication of data can be implemented between the first station 11 and the second station 12.

The host 100 may include any known computing device in the prior art, such as a server, a desktop computer, or an application server. An operating system and another application program are installed in the host 100. There may be multiple hosts 100.

In the application scenario shown in FIG. 1, both the first station 11 and the second station 12 may accept access of the host 100. In a case, some hosts 100 write data into the first station 11, and some hosts 100 write data into the second station 12. In another case, one host 100 may separately write different data into the first station 11 and the second station 12. In another case, different hosts 100 may respectively write data into the first station 11 and the second station 12. For example, a host A writes data into the first station 11, and a host B writes data into the second station 12; or a host A writes data A into the first station 11, and writes data B into the second station 12. It may be understood that the first station 11 and the second station 12 may simultaneously bear a service of the host 100, and therefore, efficiency of reading and writing data can be improved. In addition, in this embodiment of the present invention, synchronous replication can be implemented between the first station 11 and the second station 12, to ensure real-time data synchronization between the first station 11 and the second station 12. It should be noted that in the storage system shown in FIG. 1, both the first station 11 and the second station 12 may accept access of the host 100, and the first station 11 and the second station 12 maintain consistency of stored data by means of synchronous replication, and therefore the first station 11 and the second station 12 may be interchanged.

In this embodiment of the present invention, data stored in the first station 11 and the second station 12 may maintain synchronized in real time by means of a synchronous replication technology. For example, when the host 100 writes data into the first station 11, the first station 11 may simultaneously back up the data onto the second station 12. When the data is written into both the first station 11 and the second station 12, the first station 11 returns a write success response to the host 100, to maintain data synchronization between the first station 11 and the second station 12. It should be noted that in this embodiment of the present invention, that data is written into the first station 11 may be that data is written into a cache of the first station 11, or may be that data is written into a memory of the first station 11, and this is not limited herein.

In addition, the storage system in this embodiment may further include at least one quorum server 130. Data transmission is performed between the first storage device 110 and the quorum server 130 or between the second storage device 120 and the quorum server 130 by using the IP. Data synchronization is implemented between the first storage device 110 and the second storage device 120 by using a link. Therefore, if a fault occurs on the link in actual application, data synchronization cannot be implemented between the first storage device 110 and the second storage device 120, and the quorum server 130 needs to determine a storage device that is to take over all host services. The quorum server 130 may include any known computing device in the prior art, such as a server, a desktop computer, or an application server.

Generally, the two storage devices may detect whether a fault occurs on the link or on each other by means of a heartbeat between the two storage devices. For example, when the second storage device 120 does not receive a heartbeat signal of the first storage device 110 in a specified time, the second storage device 120 may determine that a fault occurs on the link or on the first storage device 110. In this case, the second storage device 120 may send an arbitration request to the quorum server 130 to request to take over all host services. Similarly, when the first storage device 110 does not receive a heartbeat signal of the second storage device 120 in a specified time, the first storage device 110 may determine that a fault occurs on the link or on the second storage device 120. In this case, the first storage device 110 may send an arbitration request to the quorum server 130 to request to take over all host services.

In the storage system shown in FIG. 1, the first storage device 110, the second storage device 120, and the quorum server 130 belong to a HyperMetro domain. The HyperMetro domain is a domain in which when a service conflict occurs between two or more storage devices, one quorum server 130 coordinates a storage device that is to take over a host service. Each HyperMetro domain may be identified by using an arbitration ID, and the first storage device 110, the second storage device 120, and the quorum server 130 store the arbitration ID. When the first storage device 110 and the second storage device 120 send arbitration requests to the quorum server 130, the arbitration ID may be carried in the arbitration requests. After receiving an arbitration request, the quorum server 130 determines whether an arbitration ID carried in the arbitration request is consistent with the arbitration ID stored in the quorum server 130. If the arbitration ID carried in the arbitration request is consistent with the arbitration ID stored in the quorum server 130, the quorum server 130 performs processing; or if the arbitration ID carried in the arbitration request is not consistent with the arbitration ID stored in the quorum server 130, the quorum server 130 does not perform processing.

In addition, the first storage device 110 and the second storage device 120 may register device information (such as a device identifier) of the first storage device 110 and the second storage device 120 in the quorum server 130. For example, the first storage device 110 sends a device identifier (for example, A) of the first storage device 110 to the quorum server 130, and the quorum server 130 receives the device identifier A of the first storage device 110, generates an identifier A' corresponding to the identifier A, and stores a correspondence between the identifier A and the identifier A' in the quorum server 130, so as to complete registration of the first storage device 110. Similarly, the second storage device 120 sends a device identifier (for example, B) of the second storage device 120 to the quorum server 130, and the quorum server 130 receives the device identifier B of the second storage device 120, generates an identifier B' corresponding to the identifier B, and stores a correspondence between the identifier B and the identifier B' in the quorum server 130, so as to complete registration of the second storage device 120.

In addition, in this embodiment, the first storage device 110 and the second storage device 120 belong to a HyperMetro domain. Therefore, the first storage device 110 and the second storage device 120 have a same arbitration ID. The arbitration ID, a correspondence between the arbitration ID and the identifier A, a correspondence between the arbitration ID and the identifier A', a correspondence between the arbitration ID and the identifier B, and a correspondence between the arbitration ID and the identifier B' need to be stored in the quorum server 130, and are used by the quorum server 130 to determine a storage device that is to take over a host service. A correspondence between the arbitration ID and each identifier may be shown in the following table.

| Arbitration ID | Device identifier A | Device identifier A' |
|---|---|---|
|  | Device identifier B | Device identifier B' |

Figure 2:
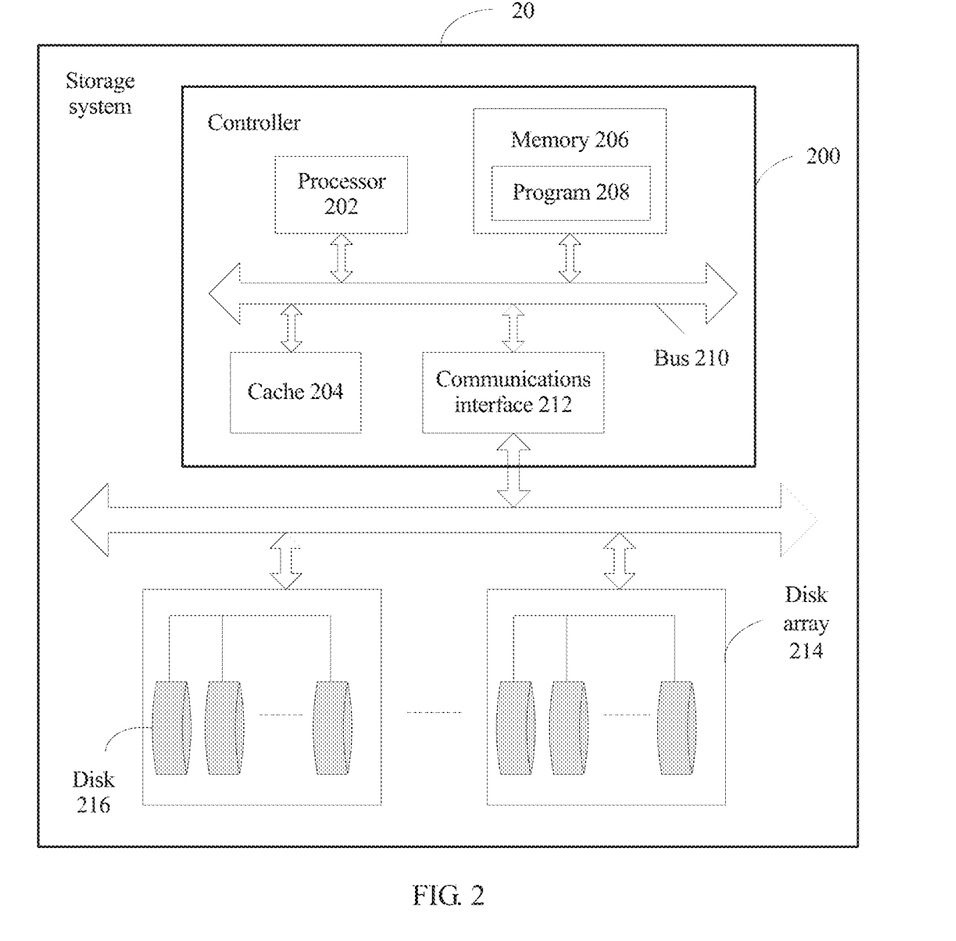
FIG. 2 is a structural diagram of a storage device according to an embodiment of the present invention.

Structures of the first storage device 110 and the second storage device 120 shown in FIG. 1 may be that shown in FIG. 2. FIG. 2 is a schematic structural diagram of a storage device 20 according to an embodiment of the present invention. The storage device 20 shown in FIG. 2 is a storage array. As shown in FIG. 2, the storage device 20 may include a controller 200 and a disk array 214. The disk array 214 herein is configured to provide storage space, and may include a redundant array of independent disks (RAID), or a disk chassis including multiple disks. There may be multiple disk arrays 214, and the disk array 214 includes multiple disks 216. The disk 216 is configured to store data. The disk array 214 may be in communication connection with the controller 200 by using a communication protocol such as the Small Computer System Interface (SCSI) protocol, and this is not limited herein.

It may be understood that the disk array 214 is only an example of a memory in the storage system. In this embodiment of the present invention, data may also be stored by using a memory such as a tape library. It should be noted that the disk 216 is also only an example of a memory constructing the disk array 214. In actual application, there is an implementation such as constructing a disk array between cabinets including multiple disks. Therefore, in this embodiment of the present invention, the disk array 214 may further include a memory including a non-volatile storage medium, such as a cabinet or a server that includes a solid state drive (SSD) and multiple disks. This is not limited herein.

The controller 200 is a "brain" of the storage device 20, and mainly includes a processor 202, a cache 204, a memory 206, a communications bus (which is referred to as a bus for short) 210, and a communications interface 212. The processor 202, the cache 204, the memory 206, and the communications interface 212 complete mutual communication by using the communications bus 210. It should be noted that in this embodiment of the present invention, there may be one or more controllers 200 in the storage device 20. It may be understood that when the storage device 20 includes at least two controllers 200, stability of the storage device 20 may be improved.

There may be multiple communications interfaces 212, and are respectively configured to communicate with the host 100, the disk 216, and another storage device. The communications interface 212 that communicates with the host 100 may also be referred to as a front-end port.

The memory 206 is configured to store a program 208. The memory 206 may include a high-speed RAM memory, and may further include a non-volatile memory, for example, at least one magnetic disk memory. It may be understood that the memory 206 may be a non-transitory machine-readable medium capable of storing program code, such as a random-access memory (RAM), a magnetic disk, a hard disk, an optical disc, a solid state disk (SSD), or a non-volatile memory.

The program 208 may include program code, and the program code includes a computer operation instruction. The following provides a detailed description.

The cache 204 is a memory between the controller and a hard disk, and a capacity of the cache 204 is less than that of the hard disk, but a speed of the cache 204 is faster than that of the hard disk. The cache 204 is configured to cache data received from the host 100 and another storage device, and cache data read from the disk 216, so as to improve performance and reliability of an array. The cache 204 may be a non-transitory machine-readable medium capable of storing data, such as a RAM, a ROM, a flash memory, or a solid state disk (SSD). This is not limited herein. In some scenarios, the cache 204 and the memory 206 may be integrated into a same physical device. That is, the memory 204 may provide a function of the memory 206. Therefore, in this embodiment, a cache and a memory may not be distinguished, and a cache resource is a memory resource.

The processor 202 may include one or more central processing units CPU, or an application-specific integrated circuit (ASIC), or one or more integrated circuits configured to implement this embodiment of the present invention. The processor 202 may process an input/output (I/O) request for the disk 216, process data in the disk 216, and so on. In this embodiment of the present invention, the processor 202 is configured to execute the program 208, and specifically, may execute related steps in the following method embodiment.

It may be understood that in this embodiment of the present invention, the first storage device 110 and the second storage device 120 have similar hardware structures.

Figure 3:
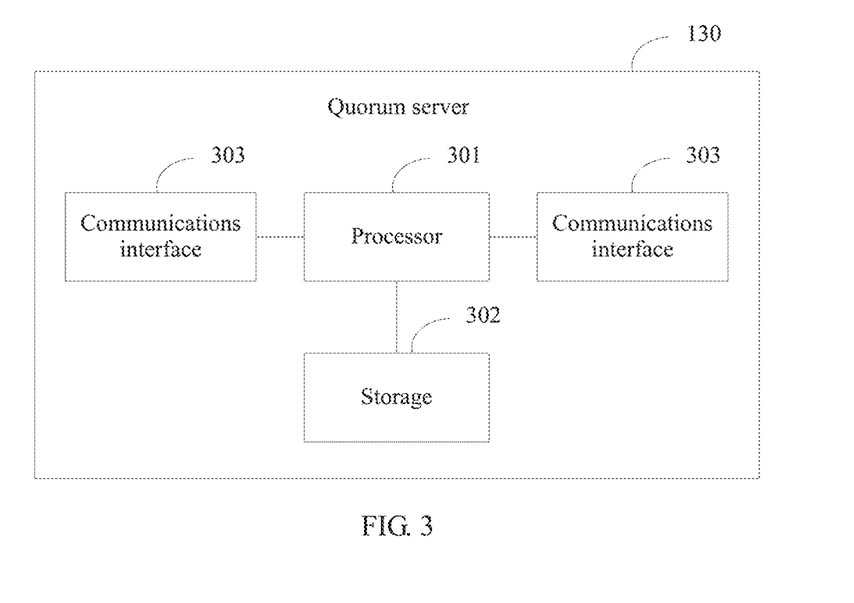
FIG. 3 is a structural diagram of a quorum server according to an embodiment of the present invention.

A hardware structure of the quorum server 130 is described below. As shown in FIG. 3, the quorum server 130 is a server, and includes at least a processor 301, a memory 302, and a communications interface 303.

The processor 301 may include one or more central processing units CPU, or an application-specific integrated circuit (ASIC), or one or more integrated circuits configured to implement this embodiment of the present invention. In this embodiment, after receiving arbitration requests sent by the first storage device 110 and the second storage device 120, the processor 301 may determine, according to an arbitration rule, a storage device that is to take a host service. The memory 302 is configured to store a program, and may include a high-speed RAM memory, and may further include a non-volatile memory. It may be understood that the memory 302 may be a non-transitory machine-readable medium capable of storing program code, such as a random-access memory (RAM), a magnetic disk, a hard disk, an optical disc, a solid state disk (SSD), or a non-volatile memory. In this embodiment, the memory 302 may be configured to store software code such as the arbitration rule, and may be further configured to store data or information sent by the first storage device 110 and the second storage device 120. There may be one or more communications interfaces 303, configured to communicate with the first storage device 110 and the second storage device 120.

Service takeover methods specifically implemented by storage devices in embodiments of the present invention are described below in detail.

Figure 4:
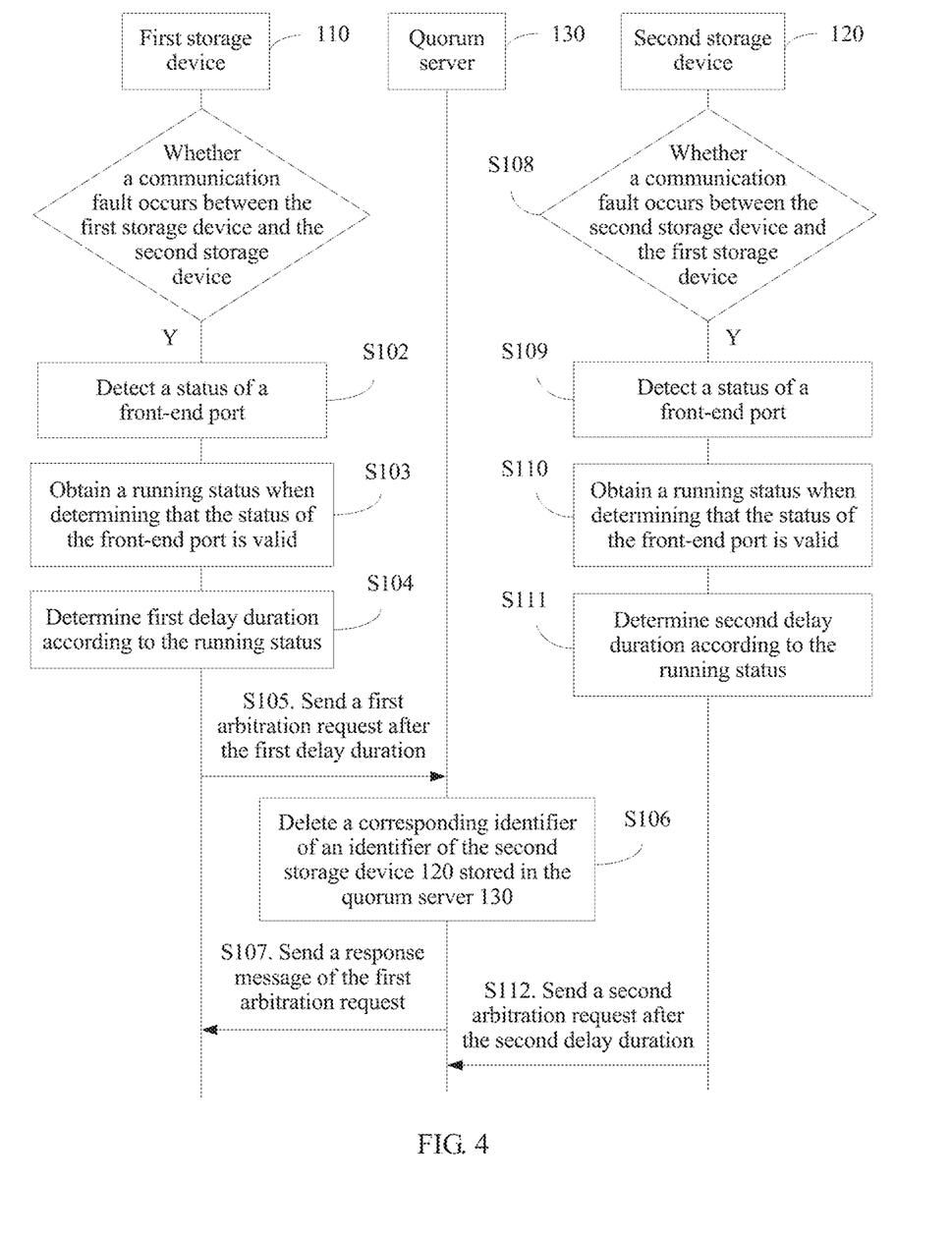
FIG. 4 is a schematic flowchart a service takeover method according to an embodiment of the present invention.

FIG. 4 is a flowchart of a service takeover method according to an embodiment of the present invention. The method may be applied to an application scenario shown in FIG. 1. In addition, hardware structures of a first storage device 110 and a second storage device 120 in this embodiment of the present invention may be that shown in FIG. 2. Specifically, the method shown in FIG. 4 may be jointly performed by processors of the first storage device 110 and the second storage device 120. Step S101 to step S105 are performed by a processor 202 of the first storage device 110, step S106 and step S107 are performed by a processor 301 of a quorum server 130, and step S108 to step S112 are performed by a processor of the second storage device 120. The service takeover method shown in FIG. 4 is described with reference to FIG. 1 and FIG. 2. As shown in FIG. 4, the method may include the following steps.

STEP S101. The first storage device 110 detects whether a communication fault occurs between the first storage device 110 and the second storage device 120.

This embodiment is applied to a HyperMetro scenario. In this scenario, both the first storage device 110 and the second storage device 120 may process a service request of a host 100, for example, receive a write data request sent by the host 100, and write data carried in the write data request into the storage device (if the first storage device processes the service request, the data is written into the first storage device; or if the second storage device processes the service request, the data is written into the second storage device); or receive a read data request sent by the host 100, and send data that needs to be read according to the read data request to the host 100. Because both the first storage device 110 and the second storage device 120 may process a service request of the host 100, the first storage device 110 and the second storage device 120 separately store a part of data from the host 100. To maintain data consistency between the two storage devices, the first storage device 110 needs to synchronize data stored in the first storage device 110 to the second storage device 120. Similarly, the second storage device 120 also needs to synchronize data stored in the second storage device 120 to the first storage device 110. Therefore, the two storage devices need to synchronize data by using a link between the two storage devices. If a fault occurs on the link, a data synchronization operation is interrupted.

Specifically, the first storage device 110 may detect, according to a heartbeat signal between the first storage device 110 and the second storage device 120, whether a fault occurs on the link or on the second storage device 120. For example, when the first storage device 110 does not receive a heartbeat signal of the second storage device 120 in a specified time, the first storage device 110 may determine that a fault occurs on the link or on the second storage device 120. In this way, the first storage device 110 determines whether a communication fault occurs between the first storage device 110 and the second storage device 120. It should be noted that if the first storage device 110 detects that a communication fault occurs between the first storage device 110 and the second storage device 120, a fault may occur on the link, or a fault may occur in the second storage device, and consequently, communication cannot be performed. Alternatively, the first storage device 110 may not use a heartbeat signal between the first storage device 110 and the second storage device 120 to detect whether a fault occurs on the link. For example, when the link is physically disconnected, the first storage device 110 receives a notification message indicating that the link is disconnected.

Step S102: The first storage device 110 detects a status of a front-end port of the first storage device 110.

The front-end port herein is a communications interface used by the first storage device 110 to communicate with the host 100, for example, a communications interface 212 shown in FIG. 2. The status of the front-end port may be valid or invalid. When the status is valid, it indicates that a connection between the first storage device 110 and the host 100 is in a normal state, and the first storage device 110 can receive a service request of the host 100. When the status is invalid, it indicates that the connection between the first storage device 110 and the host 100 is in an abnormal state, and the first storage device 110 cannot receive a service request of the host 100. When the front-end port is in an invalid state, it indicates that the first storage device 110 is not capable of taking over a host service. Therefore, the first storage device 110 gives up sending an arbitration request to the quorum server 130.

In some scenarios, if the front-end port becomes abnormal, a system automatically reports an error. Therefore, the first storage device 110 does not need to actively detect the status of the front-end port. The status of the front-end port is valid by default as long as no error alert occurs.

Step S103: When determining that the status of the front-end port is valid, the first storage device 110 obtains a running status of the first storage device 110.

The running status reflects current usage of a system resource of the first storage device 110. The system resource includes at least one or any combination of the following resources: a processor resource, a hard disk resource, a cache resource, or a host bandwidth resource.

For example, in this embodiment, the running status of the first storage device 110 may be reflected by a running status value of the first storage device, which is represented by S. The running status value is obtained according to the current usage ratio of the system resource of the first storage device and a correspondence between a usage ratio of the system resource and a status value of the system resource. The correspondence is preset. The first storage device 110 has a setting interface. After collecting statistics about running statuses of the first storage device 110, a system administrator may set the correspondence by using the setting interface. The running status value may be stored in a cache 204 of the first storage device 110. Current usage of these system resources may be respectively reflected by parameters such as a processor usage ratio, a hard disk usage ratio, a cache usage ratio, and a host bandwidth usage ratio. The processor usage ratio (which is also referred to as a CPU usage ratio) is a CPU resource occupied by a running program, and represents a program running situation of a storage device at a time point. A high usage ratio indicates that the storage device runs many programs at this time point, and on the contrary, a low usage ratio indicates that the storage device runs few programs at this time point. In addition, in this embodiment, a processor usage ratio in an interval is corresponding to a processor status value. In this embodiment, Q1 represents a current processor status value corresponding to a current processor usage ratio. The hard disk usage ratio (which is also referred to as a disk usage ratio) is a ratio of a used capacity to a total available capacity in a disk. A hard disk usage ratio in an interval is corresponding to a hard disk status value. In this embodiment, Q2 represents a current hard disk status value corresponding to a current hard disk usage ratio. The cache usage ratio (which is also referred to as a cache water mark) is a ratio of used pages to total available pages in a cache. A cache usage ratio in an interval is corresponding to a cache status value. In this embodiment, Q3 represents a current cache status value corresponding to a current cache usage ratio. The host bandwidth usage ratio is a ratio of used bandwidth to total bandwidth in bandwidth between the host and the storage device. A host bandwidth usage ratio in an interval is corresponding to a host bandwidth status value. In this embodiment, Q4 represents a current host bandwidth status value corresponding to a current host bandwidth usage ratio.

The Mowing describes how to obtain the running status value S of the first storage device. In this embodiment, $S=Q1+Q2+Q3+Q4$. In this embodiment, a current running status of each system resource may be monitored, so as to obtain a current usage ratio of each system resource. In addition, the cache 204 or a memory 206 in the first storage device 110 further stores the correspondence between the usage ratio of the system resource and the status value of the system resource. For example, Table 1 reflects a correspondence between a processor usage ratio and a processor status value.

TABLE 1

| Processor Status Value | Processor Usage ratio |
|---|---|
| 0 | <50% |
| 1 | [50%-60%) |
| 2 | [60%-70%) |
| ... | ... |

Therefore, after obtaining a current processor usage ratio by means of monitoring, the first storage device 110 may obtain a current processor status value Q1 according to the current processor usage ratio and the correspondence between the processor usage ratio and the processor status value.

Table 2 reflects a correspondence between a hard disk usage ratio and a hard disk status value.

TABLE 2

| Hard Disk Status Value | Hard Disk Usage ratio |
|---|---|
| 0 | <50% |
| 1 | [50%-60%) |
| 2 | [60%-70%) |
| ... | ... |

Therefore, after obtaining a current hard disk usage ratio by means of monitoring, the first storage device 110 may obtain a current hard disk status value Q2 according to the current hard disk usage ratio and the correspondence between the hard disk usage ratio and the hard disk status value.

Table 3 reflects a correspondence between a cache usage ratio and a cache status value.

TABLE 3

| Cache Status Value | Cache Usage ratio |
|---|---|
| 0 | <50% |
| 1 | [50%-60%) |
| 2 | [60%-70%) |
| ... | ... |

Therefore, after obtaining a current cache usage ratio by means of monitoring, the first storage device 110 may obtain a current cache status value Q3 according to the current cache usage ratio and the correspondence between the cache usage ratio and the cache status value.

Table 4 reflects a correspondence between a host bandwidth usage ratio and a host bandwidth status value.

TABLE 4

| Host Bandwidth Status Value | Host Bandwidth Usage ratio |
|---|---|
| 0 | <50% |
| 1 | [50%-60%) |
| 2 | [60%-70%) |
| ... | ... |

Therefore, after obtaining a current host bandwidth usage ratio by means of monitoring, the first storage device 110 may obtain a current host bandwidth status value Q4 according to the current host bandwidth usage ratio and the correspondence between the host bandwidth usage ratio and the host bandwidth status value.

It should be noted that the running status value S may be a sum of Q1, Q2, Q3, and Q4, or may be a sum of a part of Q1, Q2, Q3, and Q4 (for example, S=Q1+Q3), or may even be equal to one status value (for example, S=Q1).

In addition, S may also be a sum of weighted values of Q1, Q2, Q3, and Q4. For example, if a weight is set for each system resource, for example, a weight of the processor resource is 40%, a weight of the hard disk resource is 30%, a weight of the cache resource is 20%, and a weight of the host bandwidth resource is 10%, S=Q1*40%+Q2*30%+Q3*20%+Q4*10%. It may be understood that the weight of each system resource may be adjusted according to an importance degree of the resource. The weight of each system resource is not limited in this embodiment.

In general, the running status value is obtained according to a status value reflecting a current running status of each system resource, and is used to reflect a current overall running status of the storage device. An algorithm for obtaining the running status value according to each status value is not limited in this embodiment. The running status value may be obtained by means of periodic calculation, and be stored in the first storage device 110.

In addition, in the correspondences of Table 1 to Table 4, each usage ratio interval and a corresponding status value may be adjusted according to an actual running status of the storage device, and are not limited in this embodiment. In addition, it may be understood that the foregoing system resource is only an example of this embodiment of the present invention. The storage device may further include another system resource, and a status value of the another system resource may also reflect the running status value.

Step S104: The first storage device 110 determines delay duration according to the running status.

In this embodiment, after detecting that a communication fault occurs between the first storage device 110 and the second storage device 120, the first storage device 110 does not immediately send an arbitration request to the quorum server 130, but sends an arbitration request to the quorum server 130 after waiting for a period of time. The delay duration is duration for which the first storage device waits before sending the arbitration request to the quorum server. Specifically, in this embodiment, the first storage device 110 may determine the delay duration according to the running status value. The delay duration is represented by T, and is in a unit of second(s). The delay duration T=VS, where S is the running status value, and k is any value. In an implementation, k=1, because neither excessively long nor excessively short delay duration is proper. For example, when S=3, T=3 s. In addition, in this embodiment, T cannot exceed a preset threshold because excessively long delay duration is improper. The preset threshold may be set to any value in [20, 30].

Step S105: The first storage device 110 sends an arbitration request to the quorum server 130 after the delay duration.

Before performing steps S101 to S105, the first storage device 110 may register device information of the first storage device 110 in the quorum server 130. For example, the first storage device 110 sends a device identifier A of the first storage device 110 to the quorum server 130. After receiving the identifier of the first storage device 110, the quorum server 130 generates and stores an identifier A' corresponding to the identifier A, so as to complete registration of the first storage device 110.

In step S105, the arbitration request sent by the first storage device 110 to the quorum server 130 includes an arbitration ID and the identifier of the first storage device 110.

To be distinguished from delay duration of the second storage device 120, in this embodiment, the delay duration of the first storage device 110 is referred to as first delay duration, and the delay duration of the second storage device 120 is referred to as second delay duration. To be distinguished from an arbitration request sent by the second storage device 120, in this embodiment, the arbitration request sent by the first storage device is referred to as a first arbitration request, and the arbitration request sent by the second storage device is referred to as a second arbitration request.

After receiving the first arbitration request, the quorum server 130 performs matching between the arbitration ID carried in the first arbitration request and a pre-stored arbitration ID, and when determining that the arbitration ID carried in the first arbitration request is consistent with the pre-stored arbitration ID, determines that the first storage device 110 is in an arbitration scope of the quorum server 130. In addition, the quorum server 130 does not receive the second arbitration request of the second storage device 120 before step S111. The quorum server 130 may determine, according to a principle of first receiving, that the first storage device 110 is to take over a host service.

Step S106: The quorum server 130 deletes a corresponding identifier, for example, B' described above, of an identifier of the second storage device 120 stored in the quorum server 130.

Specifically, the quorum server 130 obtains, according to a correspondence between an arbitration ID and a device identifier B and a correspondence between the device identifier B and a corresponding identifier B', the identifier B' corresponding to the device identifier B, and deletes the identifier B'.

Step S107: The quorum server 130 sends a response message of the first arbitration request to the first storage device 110.

The response message includes the corresponding identifier of the device identifier of the first storage device 110, for example, A' described above. When receiving A', the first storage device 110 may learn that the first storage device 110 wins in an arbitration and can take over a host service.

Step S108: The second storage device 120 detects whether a communication fault occurs between the second storage device 120 and the first storage device 110.

Similarly, the second storage device 120 also needs to detect whether a communication fault occurs between the second storage device 120 and the first storage device 110. When detecting that a communication fault occurs, the second storage device 120 also needs to send an arbitration request to the quorum server 130. Step S108 and step S101 are similar, and are only performed by different execution bodies. For details, refer to the description in step S101. Details are not described herein again.

Step S109: The second storage device 120 detects a status of a front-end port of the second storage device 120.

In step S109, the front-end port is a communications interface used by the second storage device 120 to communicate with the host 100, and similarly has a valid state and an invalid state. For details, refer to the description in step S102. Details are not described herein again.

Step S110: When determining that the status of the front-end port is valid, the second storage device 120 obtains a running status of the second storage device 120.

In this embodiment, a running status value of the second storage device may be represented by S', and is used to reflect a running status of a system resource of the second storage device 120. Compared with step S103, this step is only performed by a different execution body. For details, refer to the description in step S103. Details are not described herein again.

Step S111: The second storage device 120 determines delay duration according to the running status.

Compared with step S104, this step is only performed by a different execution body. For details, refer to the description in step S104. Details are not described herein again.

Step S112: The second storage device 120 sends an arbitration request to the quorum server 130 after the delay duration.

Before performing steps S108 to S112, the second storage device 120 may register device information of the second storage device 120 in the quorum server 130. For example, the second storage device 120 sends a device identifier B of the second storage device 120 to the quorum server 130. After receiving the identifier of the second storage device 120, the quorum server 130 generates and stores an identifier B' corresponding to the identifier B, so as to complete registration of the second storage device 120.

In step S112, the arbitration request sent by the second storage device 120 to the quorum server 130 includes an arbitration ID and the identifier of the second storage device 120.

After receiving the second arbitration request, the quorum server 130 performs matching between the arbitration ID carried in the second arbitration request and a pre-stored arbitration ID, and when determining that the arbitration ID carried in the second arbitration request is consistent with the pre-stored arbitration ID, determines that the second storage device 120 is in an arbitration scope of the quorum server 130. However, because the first arbitration request arrives at the quorum server 130 earlier than the second arbitration request, and after receiving the first arbitration request, the quorum server 130 deletes the corresponding identifier of the identifier of the second storage device 120 stored in the quorum server 130. Therefore, in this case, the quorum server 130 does not send the corresponding identifier of the device identifier of the second storage device 120 to the second storage device 120, and the second storage device 120 does not receive the corresponding identifier, and therefore cannot take over a host service.

In the prior art, when detecting that a fault occurs in communication with each other, the first storage device 110 and the second storage device 120 generally send arbitration requests directly to the quorum server 130 to request to take over a host service. The quorum server 130 generally determines, based on a first received arbitration request, a storage device that is to take over a host service. However, in some cases, the first received arbitration request is sent by a storage device that is in a relatively poor running status. The relatively poor running status means that a usage ratio of a part or all of system resources of the storage device reaches a threshold. In this case, if the host service is still taken over by the storage device, service processing efficiency is relatively low. However, in this embodiment, the first storage device 110 and the second storage device 120 do not immediately send arbitration requests to the quorum server 130, but send arbitration requests to the quorum server 130 after waiting for a period of time. The quorum server 130 determines, based on a first received arbitration request, a storage device that is to take over a host service. If the first received arbitration request is sent by the first storage device 110, the quorum server 130 determines that the first storage device 110 is to take over a host service. If the first received arbitration request is sent by the second storage device 120, the quorum server 130 determines that the second storage device 120 is to take over a host service. In this embodiment, both the delay duration of the first storage device 110 and the delay duration of the second storage device 120 are obtained according to respective running statuses, and the running statuses reflect current usage of system resources of the storage devices. Therefore, the quorum server 130 can select a storage device in a best running status from storage devices that send arbitration requests to take over a host service.

Figure 5:
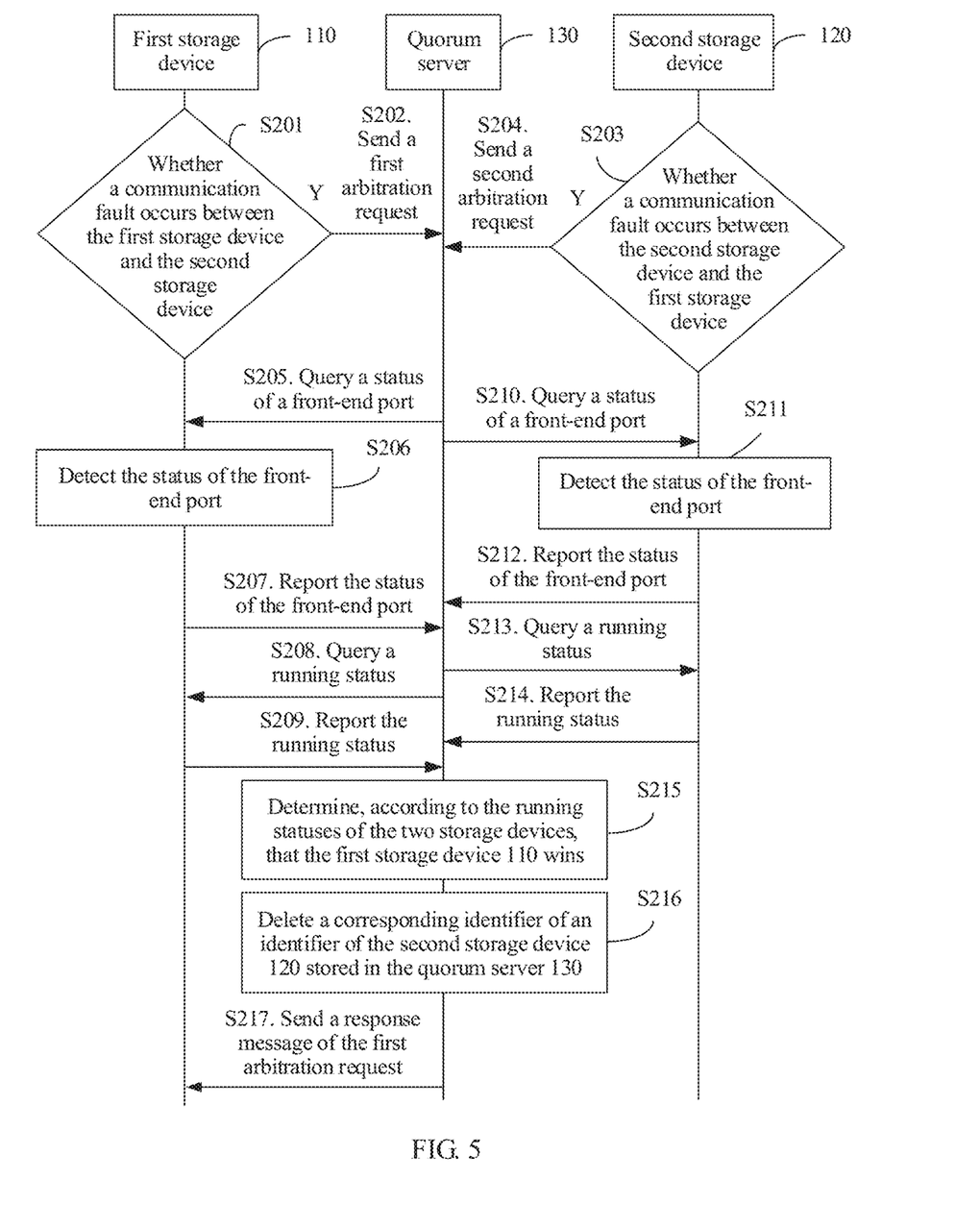
FIG. 5 is a schematic flowchart of another service takeover method according to an embodiment of the present invention.

In addition, as shown in FIG. 5, this embodiment further provides another implementation. A difference from the implementation shown in FIG. 4 is that, in the implementation shown in FIG. 5, after a quorum server 130 receives arbitration requests of a first storage device 110 and a second storage device 120, the quorum server 130 collects information about running statuses of the two storage devices from the first storage device 110 and the second storage device 120, and then makes arbitration determining. Specifically, this implementation may be performed by a processor 301 of a quorum server shown in FIG. 3. It should be noted that the implementation shown in FIG. 5 is different from the implementation shown in FIG. 4 only in an execution body and an execution sequence of some steps. For specific implementation of steps, refer to the description of FIG. 4. This implementation includes the following steps.

Step S201: The first storage device 110 detects whether a communication fault occurs between the first storage device 110 and the second storage device 120.

For a specific implementation process, refer to the description of S101 shown in FIG. 4. Details are not described herein again.

Step S202: After determining that a communication fault occurs between the first storage device 110 and the second storage device 120, the first storage device 110 sends a first arbitration request to the quorum server 130.

For a specific implementation process, refer to the description of S105 shown in FIG. 4. Details are not described herein again.

Step S203: The second storage device 120 detects whether a communication fault occurs between the second storage device 120 and the first storage device 110.

In step S203, a manner in which the second storage device 120 detects whether a communication fault occurs is similar to that in step S201, and only an execution body is different. For a specific implementation process, refer to the description of S101 shown in FIG. 4. Details are not described herein again.

Step S204: After determining that a communication fault occurs between the second storage device 120 and the first storage device 110, the second storage device 120 sends a second arbitration request to the quorum server 130.

In step S204, a manner in which the second storage device 120 sends the second arbitration request to the quorum server 130 is similar to that in step S202, and content of the arbitration request is similar to that in step S202. For a specific implementation process, refer to the description of S112 shown in FIG. 4. Details are not described herein again.

Step S205: The quorum server 130 sends a query request to the first storage device 110, to query a status of a front-end port of the first storage device 110.

Step S206: After receiving the query request, the first storage device 110 detects the status of the front-end port of the first storage device 110, and reports the status of the front-end port of the first storage device 110 to the quorum server 130 (step S207).

When the status of the front-end port of the first storage device 110 is invalid, the quorum server 130 may determine that the first storage device 110 cannot take over a host service, that is, reject the first arbitration request. When the status of the front-end port of the first storage device 110 is valid, the quorum server 130 continues to perform step S208.

It may be understood that in actual application, after sending the arbitration request to the quorum server 130, the first storage device 110 may actively report the status of the front-end port of the first storage device 110, instead of waiting for a query request sent by the quorum server 130.

Step S208: The quorum server 130 sends a query request to the first storage device 110, to query a running status of the first storage device 110.

Step S209: After receiving the query request, the first storage device 110 reports the running status of the first storage device 110 to the quorum server 130.

In an optional implementation, the first storage device 110 directly reports a usage ratio of each system resource to the quorum server 130, for example, directly reports a current processor usage ratio, a current hard disk usage ratio, a current cache usage ratio, and a current host bandwidth usage ratio to the quorum server 130. The quorum server 130 performs arbitration after receiving a running status sent by the second storage device 120. In this implementation, the quorum server 130 may pre-store correspondences between a usage ratio of system resources and status values (content of Table 1 to Table 4), and after receiving a current usage ratio of system resources sent by the first storage device 110, obtains, according to the foregoing correspondences, a status value corresponding to each usage ratio, so as to obtain a running status value that reflects an overall running status of the first storage device 110.

In another optional implementation, the first storage device 110 obtains, according to a current usage ratio of system resources and the foregoing correspondences, a status value corresponding to each usage ratio, and reports the status value corresponding to each usage ratio to the quorum server 130. The quorum server 130 obtains, according to the status value corresponding to each usage ratio, a running status value that reflects an overall running status of the first storage device 110. In this implementation, the quorum server 130 does not need to pre-store correspondences between usage ratios of system resources and status values.

In still another optional implementation, based on one of the foregoing implementations, the first storage device 110 may further obtain a running status value that reflects an overall running status of the first storage device 110, and report the running status value to the quorum server 130.

It may be understood that, in addition to the foregoing three implementations, the first storage device 110 may further report a running status of the first storage device 110 to the quorum server 130 by using an implementation. A manner in which the first storage device 110 reports the running status to the quorum server 130 and content of the running status are not limited in this embodiment.

Step S210 to step S214 are similar to step S205 to step S209. A difference is that step S210 to step S214 describe a process in which the quorum server 130 queries a front-end port status and a running status of the second storage device 120. An implementation process is similar to that of the first storage device 110, and details are not described herein again.

Step S215: The quorum server 130 determines, according to the running statuses of the two storage devices, that the first storage device 110 wins.

Specifically, the quorum server 130 may determine a victorious storage device according to a current usage ratio of each system resource reported by the first storage device 110 and a current usage ratio of each system resource reported by the second storage device 120. For example, after comprehensively considering a current usage ratio of system resources reported by the two storage devices, the quorum server 130 may determine that the first storage device 110 wins when determining that the current usage ratio of each system resource of the first storage device 110 is less than the current usage ratio of each system resource of the second storage device 120, or a current usage ratio of most system resources of the first storage device 110 is less than the current usage ratio of each system resource of the second storage device 120.

Alternatively, the quorum server 130 may determine a victorious storage device according to a status value of each system resource reported by the first storage device 110 and a status value of each system resource reported by the second storage device 120. For example, after comprehensively considering status values of system resources reported by the two storage devices, the quorum server 130 may determine that the first storage device 110 wins when determining that the status value of each system resource of the first storage device 110 is less than the status value of each system resource of the second storage device 120, or determining that a sum of status values of all system resources of the first storage device 110 is less than a sum of status values of all system resources of the second storage device 120.

Alternatively, the quorum server 130 may determine a victorious storage device according to a running status value that is reported by the first storage device 130 and that reflects an overall running status of the first storage device 110 and a running status value that is reported by the second storage device 120 and that reflects an overall running status of the second storage device 120. For example, the quorum server 130 may determine that the first storage device 110 wins when the running status value of the first storage device 110 is less than the running status value of the second storage device 120.

Step S216: The quorum server 130 deletes a corresponding identifier of an identifier of the second storage device 120 stored in the quorum server 130.

Step S216 is similar to step S106 shown in FIG. 4, and details are not described herein again.

Step S217: The quorum server 130 sends a response message of the first arbitration request to the first storage device 110.

Step S217 is similar to step S107 shown in FIG. 4, and details are not described herein again.

In the implementation shown in FIG. 5, when detecting that a communication fault occurs between the first storage device 110 and the second storage device 120, the first storage device 110 and the second storage device 120 respectively send arbitration requests to the quorum server 130. After receiving the arbitration requests sent by the two storage devices, the quorum server 130 separately queries front-end port statuses and running statuses of the two storage devices, so as to select a storage device in a best running status to take over a host service.

Figure 6:
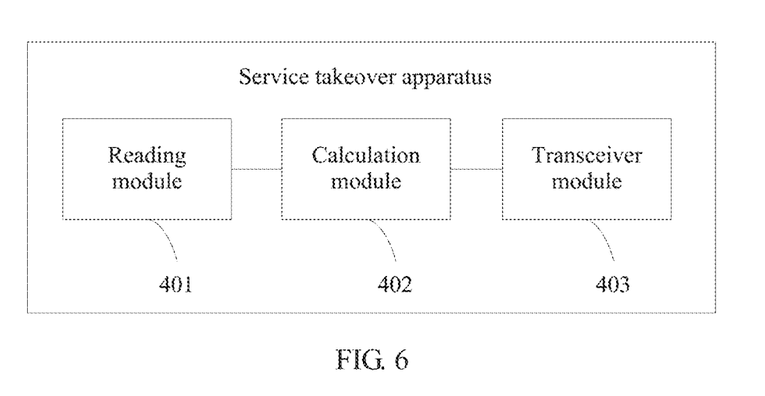
FIG. 6 is a structural diagram of a service takeover apparatus according to an embodiment of the present invention.

Referring to FIG. 6, FIG. 6 is a service takeover apparatus according to an embodiment of the present invention. The apparatus is located in a first storage device, and data communication is performed between the first storage device and a second storage device by using a link. The service takeover apparatus includes a reading module 401, a calculation module 402, and a transceiver module 403.

The reading module 401 is configured to obtain a running status of the first storage device when determining that a communication fault occurs between the first storage device and the second storage device, where the running status reflects current usage of a system resource of the first storage device, and the system resource includes at least one or any combination of the following resources: a processor resource, a hard disk resource, a cache resource, or a host bandwidth resource.

The calculation module 402 is configured to determine delay duration according to the running status, where the delay duration is duration for which the first storage device waits before sending an arbitration request to the quorum server.

The transceiver module 403 is configured to send, after the delay duration, the arbitration request to the quorum server to request to take over a service.

The reading module 401 is specifically configured to read a running status value of the first storage device, the running status value is a sum of status values of all system resources, a status value of each system resource is obtained according to a current usage ratio of each system resource and a preset correspondence, and the correspondence includes a correspondence between a current usage ratio of the processor resource and a status value of the processor resource, a correspondence between a current usage ratio of the hard disk resource and a status value of the hard disk resource, a correspondence between a current usage ratio of the cache resource and a status value of the cache resource, and a correspondence between a current usage ratio of the host bandwidth resource and a status value of the host bandwidth resource.

The calculation module 402 is specifically configured to determine the delay duration according to the running status value and a formula $T=k*S$, where T is the delay duration, S is the running status value, and k is any value. Optionally, $k=1$.

In addition, the first storage device communicates with a host by using a front-end port, and the reading module 401 is further configured to: detect a status of the front-end port, determine that the status of the front-end port is valid, and when determining that the status of the front end is valid, read the running status value of the first storage device.

For specific function implementation of the modules, refer to the method steps shown in FIG. 4. Details are not described herein again.

An ordinary person skilled in the art may understand that the foregoing storage medium may include any non-transitory machine-readable medium capable of storing program code, such as a USB flash drive, a removable hard disk, a magnetic disk, an optical disc, a random-access memory (RAM), a solid state disk (SSD), or a non-volatile memory.

Finally, it should be noted that the foregoing embodiments are merely intended for describing the technical solutions of the present invention, rather than limiting the present invention.

What is claimed is:

1. A service takeover method in an active-active (AA) storage system, comprising:
   determining that a communication fault occurs on a link between a first storage device and a second storage device included in the AA storage system;
   obtaining a first running status of the first storage device and a second running status of the second storage device, wherein the first running status is configured to indicate a performance of data processing by the first storage device, the second running status is configured to indicate a performance of data processing by the second storage device; and
   selecting, based on the first running status and the second running status, the first storage device as a winner to remain accessible to a host in response to determining that the communication fault occurs on the link between the first storage device and the second storage device, wherein the performance of data processing by the first storage device is higher than the performance of data processing by the second storage device, wherein the second storage device being set inaccessible to the host.

2. The method according to the claim 1, further comprising:
   checking that a communication between the first storage device and the host is available.

3. The method according to the claim 1, further comprising:
   receiving a first arbitration request sent by the first storage device; and
   receiving a second arbitration request sent by the second storage device, wherein the second arbitration request is sent later than the first arbitration request.

4. The method according to the claim 3, wherein the first arbitration request is sent based on the first running status of the first storage device, and wherein the second arbitration request is sent based on the second running status of the second storage device.

5. An active-active (AA) storage system, comprising a first storage device, a second storage device, and a quorum server,
   wherein the quorum server is configured to:
      determine that a communication fault occurs on a link between the first storage device and the second storage device;
      obtain a first running status of the first storage device, wherein the first running status is configured to indicate a performance of data processing by the first storage device;
      obtain a second running status of the second storage device, wherein the second running status is configured to indicate a performance of data processing by the second storage device; and
      select, based on the first running status and the second running status, the first storage device as a winner to remain accessible to a host in response to determining that the communication fault occurs on the link between the first storage device and the second storage device, wherein the performance of data processing by the first storage device is higher than the performance of data processing by the second storage device, wherein the second storage device being set inaccessible to the host.

6. The storage system according to claim 5,
wherein the quorum server is further configured to check that a communication between the first storage device and the host is available.

7. The storage system according to claim 5, wherein the first storage device is configure to send the first running status to the quorum server, and wherein the second storage device is configured to send the second running status to the quorum server.

8. An active-active (AA) storage system, comprising a first storage device, a second storage device, and a quorum server,
wherein the quorum server is configured to determine that a communication fault occurs on a link between the first storage device and the second storage device;
wherein the first storage device is configured to obtain a first running status of the first storage device, wherein the first running status is configured to indicate a performance of data processing by the first storage device;
wherein the second storage device is configured to obtain a second running status of the second storage device, wherein the second running status is configured to indicate a performance of data processing by the second storage device; and
wherein the quorum server is further configured to select, based on the first running status and the second running status, the first storage device as a winner to remain accessible to a host in response to determining that the communication fault occurs on the link between the first storage device and the second storage device, wherein the performance of data processing by the first storage device is higher than the performance of data processing by the second storage device, wherein the second storage device being set inaccessible to the host.

9. The storage system according to claim 8, wherein the first storage device is further configured to send the first running status to the quorum server, and wherein the second storage device is further configured to send the second running status to the quorum server.

10. The storage system according to claim 8,
wherein the first storage device is further configured to send a first arbitration request to the quorum server based on the first running status,
wherein the second storage device is further configured to send a second arbitration request to the quorum server based on the second running status, and wherein the second arbitration request received by the quorum server is later than the first arbitration request received by the quorum server.

* * * * *

UNITED STATES PATENT AND TRADEMARK OFFICE
CERTIFICATE OF CORRECTION

| | |
|---|---|
| PATENT NO. | : 11,740,982 B2 |
| APPLICATION NO. | : 17/826428 |
| DATED | : August 29, 2023 |
| INVENTOR(S) | : Cheng Zhang |

It is certified that error appears in the above-identified patent and that said Letters Patent is hereby corrected as shown below:

In the Claims

In Column 21, Line 11 (approx.), Claim 7, please delete "configure" and insert therefore -- configured --.

Signed and Sealed this
Eighth Day of October, 2024

Katherine Kelly Vidal
Director of the United States Patent and Trademark Office